United States Patent Office 3,434,560
Patented Mar. 25, 1969

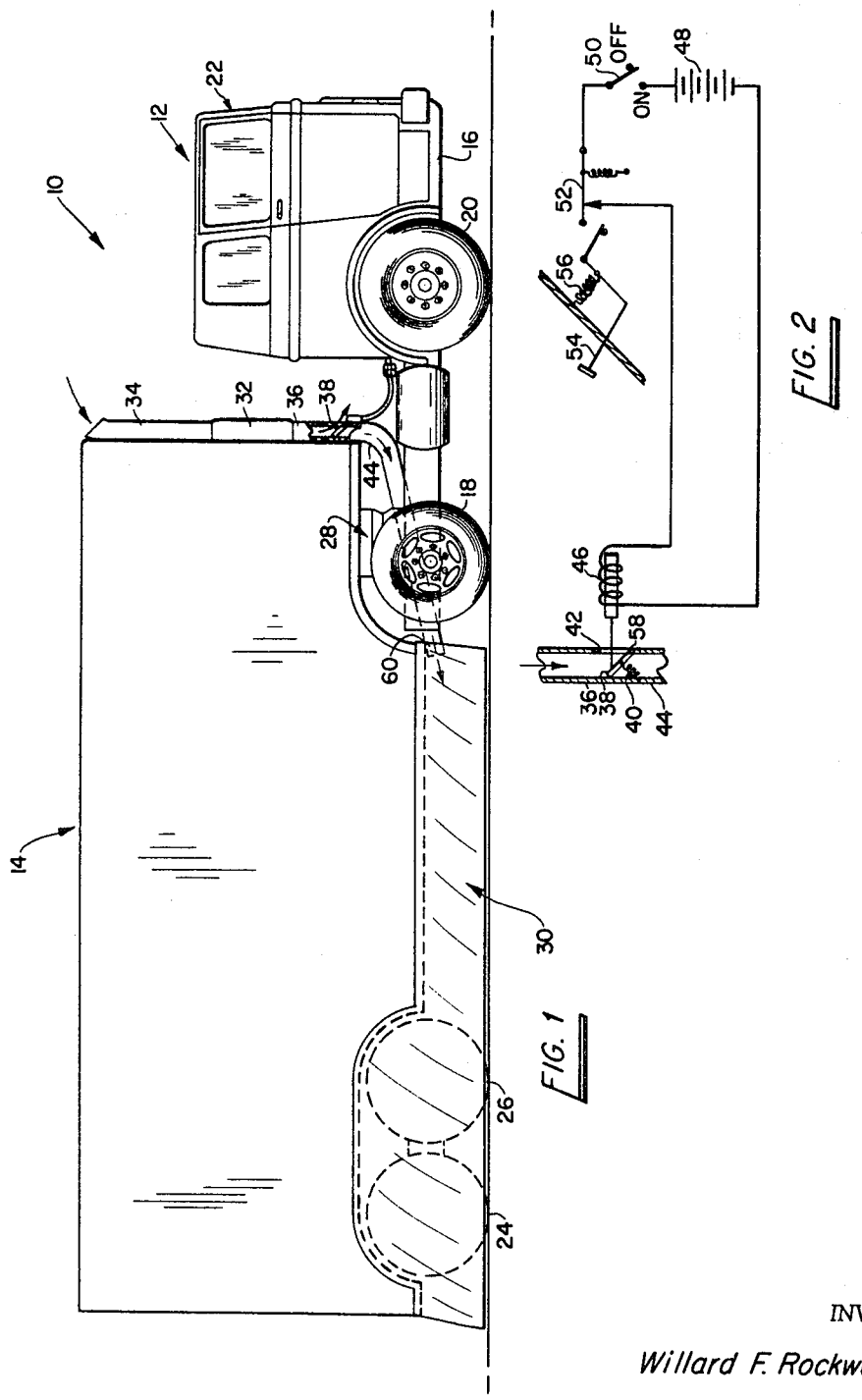

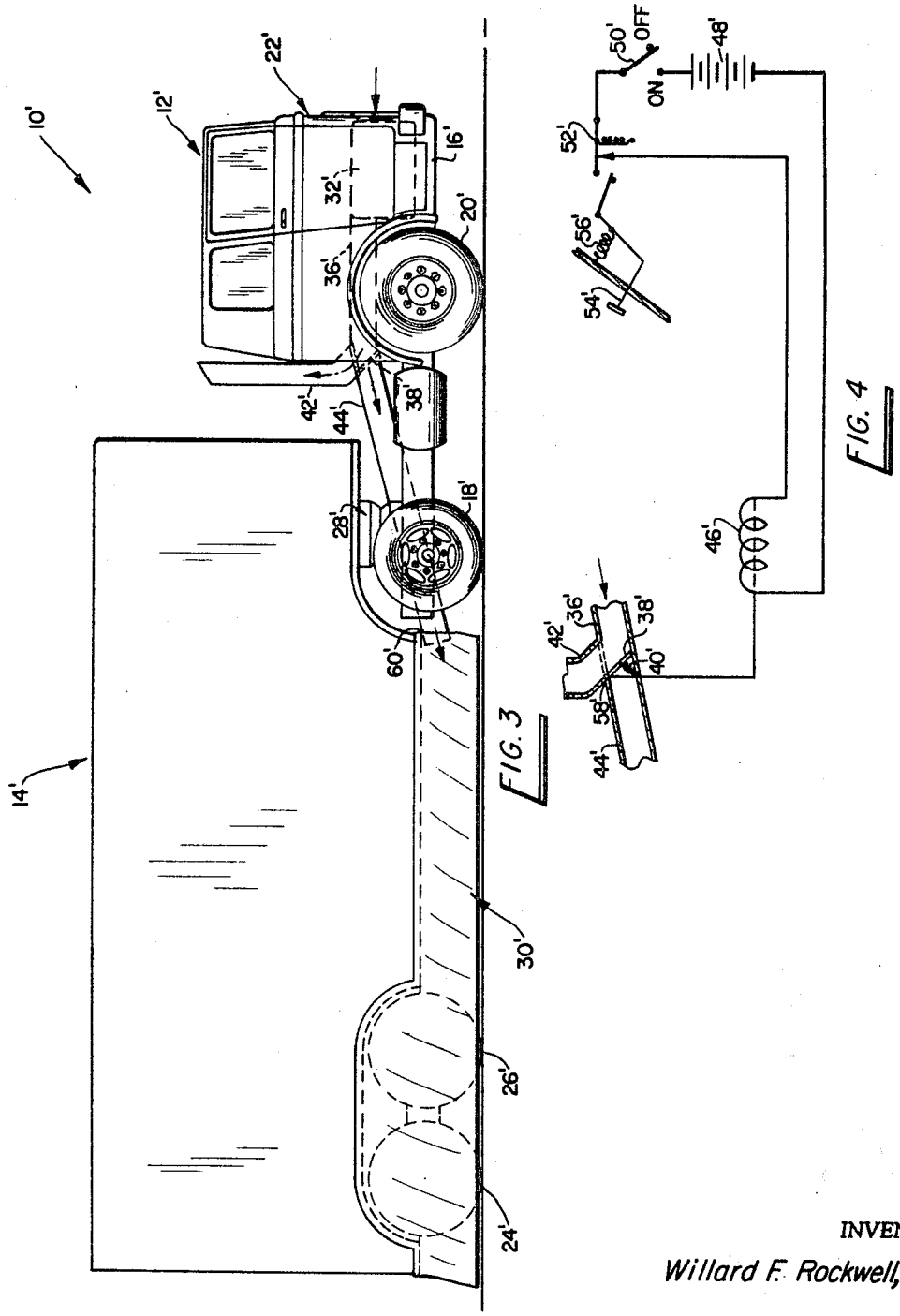

3,434,560
TRACTOR-TRAILER WITH GROUND
EFFECT DEVICE
Willard F. Rockwell, Jr., Pittsburgh, Pa., assignor to
North American Rockwell Corporation, a corporation
of Delaware
Filed Dec. 19, 1966, Ser. No. 602,693
Int. Cl. B60v 1/00; B60d 1/08
U.S. Cl. 180—119                                    2 Claims

ABSTRACT OF THE DISCLOSURE

A tractor-trailer over-the-road vehicle in which a ground effect device is employed to selectively relieve a portion of the load on the trailer wheels while retaining sufficient traction for normal directional control and braking. Control means in the tractor permits instantaneous deactivation of the ground effect device when additional trailer wheel traction is required.

---

The present invention relates to improvements in vehicles and more particularly to improvements in load carrying over-the-road vehicles such as tractor-trailer trucks.

At present, vehicles such as these are quite large and carry very heavy loads. To minimize the stress upon the roads over which such vehicles are moved and the unit load upon the axles and wheels, it has become customary to provide plural axles (two or three) in tandem beneath the rear of the semitrailer chassis and plural tandem connected axles at the rear of the tractor supporting the forwarding end of the semitrailer through a fifth wheel connection. Each such axle is usually supported by a pair of wheels at each end to minimize the load on such wheel and reduce the stress on the road. Such arrangements are expensive and add greatly to the dead weight of the vehicle.

The present invention has as its principal object the provision of a vehicle of this general type in which the construction is of such improved form that, during normal operation of the vehicle, the stress upon the roads and the load upon the axles and wheels is substantially less for a load of any given weight than in prior art vehicles of this type.

More specifically, it is an object of the present invention to provide an improved tractor-trailer truck in which a ground effect device reacting between the body of the trailer and the ground beneath the trailer is provided to support a portion of the weight of the trailer while maintaining sufficient weight on the axles of the trailer to assure adequate frictional engagement between the trailer's wheels with the ground to assure proper tracking.

A further important object of this invention is to reduce the load imposed upon the suspension, axles and wheels of vehicles of this general type while merely maintaining sufficient load on the wheels to assure adequate frictional engagement between the wheels and the ground for tracking purposes whereby these components of the vehicle can be of lighter and less expensive construction than heretofore for a vehicle of any given load capacity.

More specifically it is an object of this invention to achieve this result by providing a superatmospheric pressure gaseous ground effect device reacting vertically between the load carrying portion of the body of the vehicle and the ground therebeneath and providing an upward thrust supporting a substantial portion of the weight of such chassis and the load if any thereon.

A further important object of the present invention is to provide an improved tractor-trailer unit in which the tractor is powered by a gas turbine and in which the exhaust gases from the turbine are utilized to supply, at least in part, the gas at superatmospheric pressure required to operate a ground effect device interposed between the body of the trailer and the ground therebeneath to support a portion of the load of the chassis on the axles and wheels of the trailer and tractor while maintaining sufficient load thereon to assure tracking of the wheels.

A still further important object of the present invention is to provide an improved vehicle in which a portion of the weight of the vehicle body or chassis is supported by a ground effect device operatively interposed between the chassis and the ground therebeneath while maintaining sufficient load upon the vehicle axles to maintain tracking during normal operation of the vehicle and wherein means are provided for controlling the flow of superatmospheric pressure gas to the ground effect device to vary the loading of the axles and wheels of the vehicle in accord with the traction requirements for various driving conditions such as in decelerating and stopping the vehicle.

These and other objects of the present invention will become more fully apparent by reference to the appended claims and as the following detailed description proceeds in reference to the accompanying drawings wherein:

FIGURE 1 is a diagrammatic illustration of a tractor-trailer unit embodying a ground effect device on the semitrailer supplied with gas at superatmospheric pressure from a compressor mounted on the semitrailer itself and constituting a first embodiment of this invention;

FIGURE 2 is a diagrammatic illustration of a control arrangement for disconnecting the ground effect device in the embodiment of FIGURE 1 from the compressor upon application of the brakes of the tractor-trailer unit;

FIGURE 3 is a view similar to FIGURE 1 of a second embodiment of the invention in which the ground effect device is supplied at least in part with gas at superatmospheric pressure from the exhaust of a gas turbine utilized to supply motive power to the tractor; and FIGURE 4 is a diagrammatic illustration of an arrangement in the embodiment of FIGURE 3 for disconnecting the ground-effect device from the exhaust of the gas turbine while the brakes of the tractor-trailer unit are being applied.

Referring now to the drawings in detail, FIGURE 1 illustrates a tractor trailer vehicle 10 consisting of an automotive tractor portion 12 and a load carrying semitrailer portion 14. In this embodiment, the tractor 12 is of essentially conventional form having a chassis 16 suspended at its rear upon a drive axle supported at its outer end upon ground-engaging drive wheels 18 and supported toward its front end upon dirigible wheels 20. An operator cab 22 and an automotive engine (not shown) the output of which is conventionally drive connected to the drive axle for the drive wheels 18 is mounted on the chassis 16.

The semitrailer 14 is suspended at its rear end upon a pair of tandem conventionally connected trailer axles supported at their outer ends upon wheels 24 and 26 for the rear and front pair of axles, respectively. The front end of the trailer extends over the aft end of the tractor 12 and is articulated to the tractor 12 by a conventional fifth wheel mechanism generally indicated at 28.

In accord with the present invention, the semitrailer 14 is provided with a ground effect housing device generally indicated at 30. In this embodiment, gas, such as air, is supplied at superatmospheric pressure to the ground effect device 30 from a compressor 32 mounted on the trailer 14. Compressor 32 has its intake from atmosphere via intake conduit 34 and discharges air at superatmospheric pressure into the conduit section 36. A control valve member 38 best shown in FIGURE 2 is interposed in conduit section 36 and is normally biased as by a spring 40 to open an exhaust port 42 and close the passage from the conduit 36 to the conduit section 44. Valve 38 may be shifted to close the exhaust port 42 and open the passage from conduit 36 to the conduit 44 by any suitable actuator such as solenoid 46.

For illustrative purposes, the coil of solenoid 46 is shown connected in series circuit with a battery 48, and off-on (ignition lock controlled) switch 50 and a normally closed brake actuated switch 52. By this arrangement, with the off-on switch 50 closed and the brake pedal 54 in its nonactuated position as established by the retraction spring 56, contact 52 is closed and the coil of the solenoid 46 energized to shift the valve 38 in a clockwise direction about its pivot 58 to close the exhaust port 42 and open the passage between the conduits 36 and 44.

With the valve 38 in this position, the superatmospheric pressure supplied by the compressor 32 passes through conduits 36 and 44 and is directed around fifth wheel assembly 28 by the conduit 44 to the inlet 60 of the ground effect device.

The compressor 32 may be driven in any suitable manner as by an internal combustion engine mounted directly on the trailer 14 or, alternatively, may be mounted on the tractor 12 and driven by the internal combustion engine thereof.

The specific form of the ground effect device 30 may be varied as desired within the principles of the present invention. The structures of such devices and the control thereof to assure symmetrical lift to prevent tilting of the vehicle are well known. Examples of prior art ground effect devices are found in United States Patent No. 3,039,550, issued June 19, 1962, to M. W. Beardsley for "Airborne Surface Vehicle," No. 3,052,483, issued Sept. 4, 1962, to T. K. Petersen for "Air Film Supported Load Carrier," No. 3,219,135, issued Nov. 23, 1965, to W. H. Bunting et al., for "Air Cushion Vehicle Skirt," No. 3,244,244, issued Apr. 5, 1966, to C. S. Cockerell for "Air Cushion Vehicles Having Flexible Skirts Deflectable by Subsidiary Cushion Pressure," and No. 3,272,271, issued Sept. 13, 1966, to C. S. Cockerell for "Air Cushion Vehicles Having Movable Cushion-Containing Walls."

When any of such prior ground effect devices are properly applied to the bottom of the body or chassis of the trailer 14 and operated in accord with this invention, the superatmospheric pressure gas supplied to the ground effect device 30 through the inlet 60 from the compressor 32 will be effective to produce a reaction between the body or chassis of the trailer 14 and the ground therebeneath to support in part the weight of the body or chassis of the trailer 14 and thereby reduce the load upon the wheels 18, 24, and 26, the axles upon which they are mounted, and the suspensions by which those axles are connected to the tractor and trailer body or chassis, respectively.

It is to be noted that in such prior devices, the ground effect devices support the entire vehicle weight. As a result, they have no practical value as over the road vehicles since the contact with the ground required for steering, braking and lateral stability is lost.

Ideally, the reaction force produced by the ground effect device 30 relieves all of the weight of the vehicle body and its load except that minimum which is required under the given driving conditions to maintain adequate frictional engagement with the road to assure tracking and proper steering and braking. The amount of load on the wheels 18, 24 and 26 required to maintain this adequate frictional engagement will of course vary in accord with the driving conditions. Deceleration or stopping of the vehicle 10 is one example of such driving conditions. For this purpose, I have provided the switch 52 (FIGURE 2) which will be opened when the brake pedal 54 is fully depressed to thereby interrupt the circuit to the solenoid 46 and permit the valve 38 to shift, under the influence of spring 40 to the position illustrated in FIGURES 1 and 2 in which it closes the connection between the conduits 36 and 44 and connects the conduit 36 to the exhaust port 42. This eliminates all or substantially all superatmospheric gas supplied to the ground effect device 30 and allows the full weight of the load and the vehicle body to be transmitted to the axles and the wheels 18, 24 and 26. Thus, during deceleration of the vehicle on stopping the vehicle, the wheels 18, 24, and 26 are fully loaded thus assuring that the brakes when applied to these wheels will be effective to stop the vehicle 10.

Depending upon the driving conditions such as the velocity of the wind and whether or not that the road is wet or covered with ice, it may be desirable to allow more or less of the load of the trailer body to be transmitted to the wheels 18, 24 and 26. This control may be effected by providing a conventional control valve (not shown) in conduit 44 between the valve 38 and the outlet 60 to vary the pressure and volume of gas supplied to the ground effect device 30 and thereby control the magnitude of the lift force produced by the device 30, or by providing conventional control means to control the rate of operation of the compressor 32.

Similarly, it is desirable to increase the load on the wheels with increases in the steering angle and the vehicle velocity to assure adequate frictional engagement between the wheels and the road in rounding corners. For this purpose the control of the pressure supply to the ground effect device 30 may be correlated with both the steering mechanism and the vehicle velocity.

While the exemplary control illustrated in this application is interposed between the source of compressed gas and the ground effect device 30, it is apparent that control of the pressure of the ground effect device can be effected either additionally or alternatively by controlling the escape of the gas from the ground effective device. Such additional control may be desirable for certain purposes to assure the necessary rapidity of response of the pressure within the ground effect device due to changing grounding conditions.

The tractor and trailer structures of the embodiment of FIGURES 3 and 4 are generally similar to the embodiment illustrated in FIGURES 1 and 2. The corresponding parts are therefore assigned like reference numerals with prime designations to avoid unnecessary description repetition. This embodiment differs from the first primarily in that the tractor 12' is powered by a gas turbine engine 32' and the exhaust from the gas turbine 32' is discharged into a conduit 36' which, when the valve 38' is in its open position, communicates with the conduit 44' to supply exhaust gas at superatmospheric pressure to the ground effect device 30'. As is indicated in FIGURE 4, the valve 38' is normally biased by a spring 40' in a clockwise direction about the pivot axis 58' to direct the exhaust gas passing through the conduit 36' into the exhaust conduit 42' to exhaust to atmosphere. Under these conditions no superatmospheric pressure is supplied to the ground effect device 30'. When the off-on switch 50' is closed, solenoid 46' will be energized so long as the switch 52' controlled by the brake pedal 54' remains closed. Energization of the solenoid 46' pivots the valve 38' to direct the turbine exhaust from conduit 36' through conduit 44' to the ground effect device 30'. As in the previous embodiment, application of the brake by actuation of brake pedal 54' opens switch 52' to de-energize the solenoid 46' and depressurize the ground effect device 30'.

If the exhaust gas from the turbine 32' does not provide adequate superatmospheric pressure gas to actuate the ground effect device 30', an auxiliary compressor driven by the turbine 32' may be provided to augment the superatmospheric gas supply to the ground effect device 30'.

The ground effect device 30' may be constructed and controlled to accommodate various conditions of travel and may be constructed as indicated above with reference to the embodiment of FIGURES 1 and 2.

As is apparent from the foregoing detailed description, the present invention contemplates utilization of a ground effect device pressurized either from an independent compressor or from the exhaust gases of the prime mover for the tractor 12' and operatively mounted on the trailer 14' to exert a lifting force thereon which will relieve the load upon the vehicle wheels, the vehicle axles, and the vehicle suspensions. As a result, when the vehicle is under way, the axles, suspensions and wheels need not withstand the high shock loadings to which they would otherwise be subjected if the ground effect device were not utilized. As a result, these components can all be constructed on the basis of a lighter weight, less expensive design resulting in economy in the original cost and in the operation of the vehicle 10 or 10'.

What is claimed and desired to be secured by Letters Patent is:

1. A tractor-trailer automotive truck comprising an automotive tractor; a trailer articulated to said tractor and having ground-engaging wheels; a ground effect device on said trailer operable to support a portion of the weight of said trailer and any load thereon; means for supplying gas to said ground effect device at a super-atmospheric pressure and in sufficient volume to support a part of the weight of said trailer and any load thereon while maintaining sufficient load on the wheels of said trailer to assure adequate frictional engagement thereof with the ground therebeneath to maintain lateral stability of the trailer; and control means for varying the volume of gas supplied to said device; said control means being connected for actuation in response to vehicle brake actuation.

2. A tractor-trailer automotive truck comprising an automotive tractor driven by a gas turbine; a trailer articulated to said tractor and having ground-engaging wheels; a ground effect device on said trailer operable to support a portion of the weight of said trailer and any load thereon; conduit means for conducting the exhaust from said gas turbine to said ground effective device at a super-atmospheric pressure and in sufficient volume to support a part of the weight of said trailer and any load thereon; vent means for selectively connecting said conduit means to atmosphere between said turbine and said ground effect device, and control means in said tractor for actuating said vent means to permit immediate disabling of said ground effect device to thereby increase the load on the trailer wheels when required for directional control or braking.

References Cited

UNITED STATES PATENTS

| | | | |
|---|---|---|---|
| 3,269,476 | 8/1966 | Jones | 180—129 |
| 3,334,700 | 8/1967 | Kennedy et al. | 180—117 |
| 3,339,656 | 9/1967 | Blonsky | 180—119 |

FOREIGN PATENTS

| | | |
|---|---|---|
| 938,664 | 10/1963 | Great Britain. |
| 1,338,368 | 8/1963 | France. |

A. HARRY LEVY, *Primary Examiner.*

U.S. Cl. X.R.

180—14, 117; 280—400